United States Patent [19]

Schambre

[11] Patent Number: 5,564,515

[45] Date of Patent: Oct. 15, 1996

[54] INSTRUMENT PANEL ASSEMBLY

[75] Inventor: John Schambre, Canton, Mich.

[73] Assignee: Chrysler Corporation, Auburn Hills, Mich.

[21] Appl. No.: 518,351

[22] Filed: Aug. 23, 1995

[51] Int. Cl.$^6$ ................................................. B62D 25/14
[52] U.S. Cl. ........................... 180/90; 280/752; 296/70; 296/194; 454/127
[58] Field of Search ............................. 180/90; 280/752; 296/70, 192, 194, 208; 454/127

[56] References Cited

U.S. PATENT DOCUMENTS

| 3,724,357 | 4/1973 | Kavthekar et al. | 454/127 |
|---|---|---|---|
| 3,876,228 | 4/1975 | Hawkins et al. | 280/752 |
| 3,897,848 | 8/1975 | Arnstson et al. | 180/90 |
| 3,907,326 | 9/1975 | Arntson et al. | 280/752 |
| 4,223,754 | 9/1980 | Mizuno et al. | 180/90 |
| 4,273,359 | 6/1981 | Scholz et al. | 280/751 |
| 4,391,465 | 7/1983 | Piano | 180/90 |
| 4,646,879 | 3/1987 | Mahler et al. | 180/90 |
| 4,662,649 | 5/1987 | Ikeda et al. | 280/752 |
| 4,721,329 | 1/1988 | Brantman et al. | 280/751 |
| 4,733,739 | 3/1988 | Lorenz et al. | 180/90 |
| 4,946,192 | 8/1990 | Kuwahara | 280/751 |
| 5,312,133 | 5/1994 | Pietilla et al. | 180/90 |
| 5,354,114 | 10/1994 | Kelman et al. | 296/192 |
| 5,356,177 | 10/1994 | Weller | 280/751 |
| 5,358,300 | 10/1994 | Gray | 296/70 |
| 5,370,417 | 12/1994 | Kelman et al. | 280/751 |

FOREIGN PATENT DOCUMENTS

| 456531 | 11/1991 | European Pat. Off. | 296/70 |
|---|---|---|---|
| 3922460 | 1/1991 | Germany | 280/751 |
| 4003952 | 8/1991 | Germany | 280/751 |
| 62-29459 | 2/1987 | Japan | 280/751 |
| 1-60470 | 3/1989 | Japan | 280/751 |
| 1-180332 | 7/1989 | Japan | 280/751 |
| 2220612 | 1/1990 | United Kingdom . | |
| WO92/04210 | 3/1992 | WIPO . | |

OTHER PUBLICATIONS

Automotive Technologies International, Inc., Apr. 24, 1991, "DynaPad–Air Damped Padding", 9 pages.
Article 910600, SAE Technical Paper Series, "One–Dimensional Model for Predicting Side Intrusion Injuries Including Effects of Padding", F. Shokoohi and D. S. Breed, pp. 81–89.

Primary Examiner—Anne Marie Boehler
Assistant Examiner—Peter C. English
Attorney, Agent, or Firm—Edward A. Craig

[57] ABSTRACT

An instrument panel assembly for an automotive vehicle molded of a resinous plastic material. The instrument panel assembly is a honey-comb structure including box-like cells throughout the entire construction to result in rigidifying the structure. The instrument panel assembly has an upper section consisting of two duct retainers which together form two integral air ducts, and a lower section consisting of two parts provides a housing for heating, ventilating and air conditioning (HEVAC) apparatus. Air from the HEVAC apparatus is discharged into the vehicle by the ducts. The ducts are formed of one piece with the duct retainers to provide a strong, rigid structure obviating the need for a steel reinforcing substructure. The HEVAC apparatus is preloaded into the housing so that the instrument panel assembly and HEVAC apparatus can be installed in the vehicle as a unit.

3 Claims, 7 Drawing Sheets

INSTRUMENT PANEL ASSEMBLY

FIELD OF THE INVENTION

This invention relates generally to instrument panel assemblies for automotive vehicles and more particularly to an instrument panel assembly which is strong and self-supporting and molded of a resinous plastic material.

BACKGROUND AND SUMMARY

Instrument panel assemblies now in use require steel beams for reinforcement. Such reinforcement adds weight and bulk to the overall structure.

In accordance with the present invention, the instrument panel assembly, which as stated is molded from a resinous plastic material, is in the form of a honey-comb structure including a plurality of box-like cells throughout the construction to result in rigidifying the entire structure.

Preferably, the instrument panel assembly has a lower section for housing heating, ventilating and air conditioning HEVAC apparatus, and an upper section provided with an integral duct or ducts for receiving air from the HEVAC apparatus and discharging it into the vehicle. The ducts consist of walls made of one piece with the upper section and these walls provide a box-like reinforcing frame providing structural support. The instrument panel assembly is rigid and self-supporting and requires no steel substructure.

Because the HEVAC apparatus is contained within a housing incorporated into the instrument panel assembly, it is possible to preload the HEVAC into the housing of the instrument panel assembly before installation into the vehicle.

Preferably, the instrument panel assembly is made of only four parts. Two of the parts, namely, an upper duct and component retainer and a lower duct and component retainer make up the upper section. The other two parts, namely, a housing tray and a housing cover, make up the lower section.

One object of the invention is to provide an instrument panel assembly having the foregoing features and capabilities.

Another object is to provide an instrument panel assembly which is strong and rigid due to its honey-comb or cell-like construction.

A further object is to provide an instrument panel assembly which is easy to install. The HEVAC apparatus may be preloaded into the housing portion of the instrument panel assembly so that the instrument panel assembly and the HEVAC apparatus may be installed in the vehicle as a unit.

Other objects, features and advantages of the invention will become more apparent as this description proceeds, especially when considered with the accompanying drawings.

BRIEF DESCRIPTION OF THE DRAWINGS

FIGS. 12 and 13 are views taken on the lines 12—12 and 13—13, respectively in FIG. 4.

DETAILED DESCRIPTION OF THE PREFERRED EMBODIMENT

Figure 1:
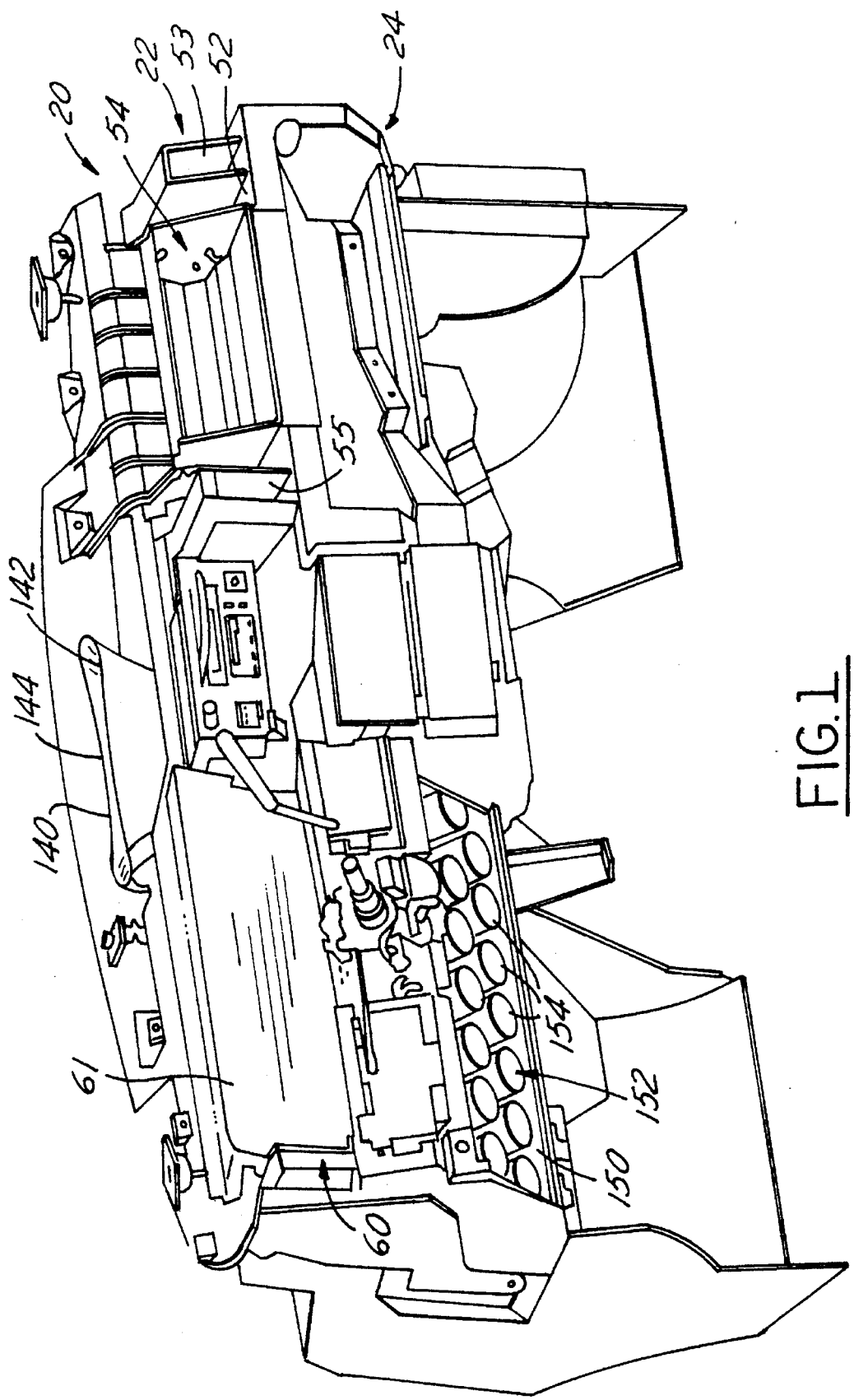
FIG. 1 is a perspective view of an instrument panel assembly constructed in accordance with the invention as seen by a driver entering the vehicle through the left front door.
Figure 2:
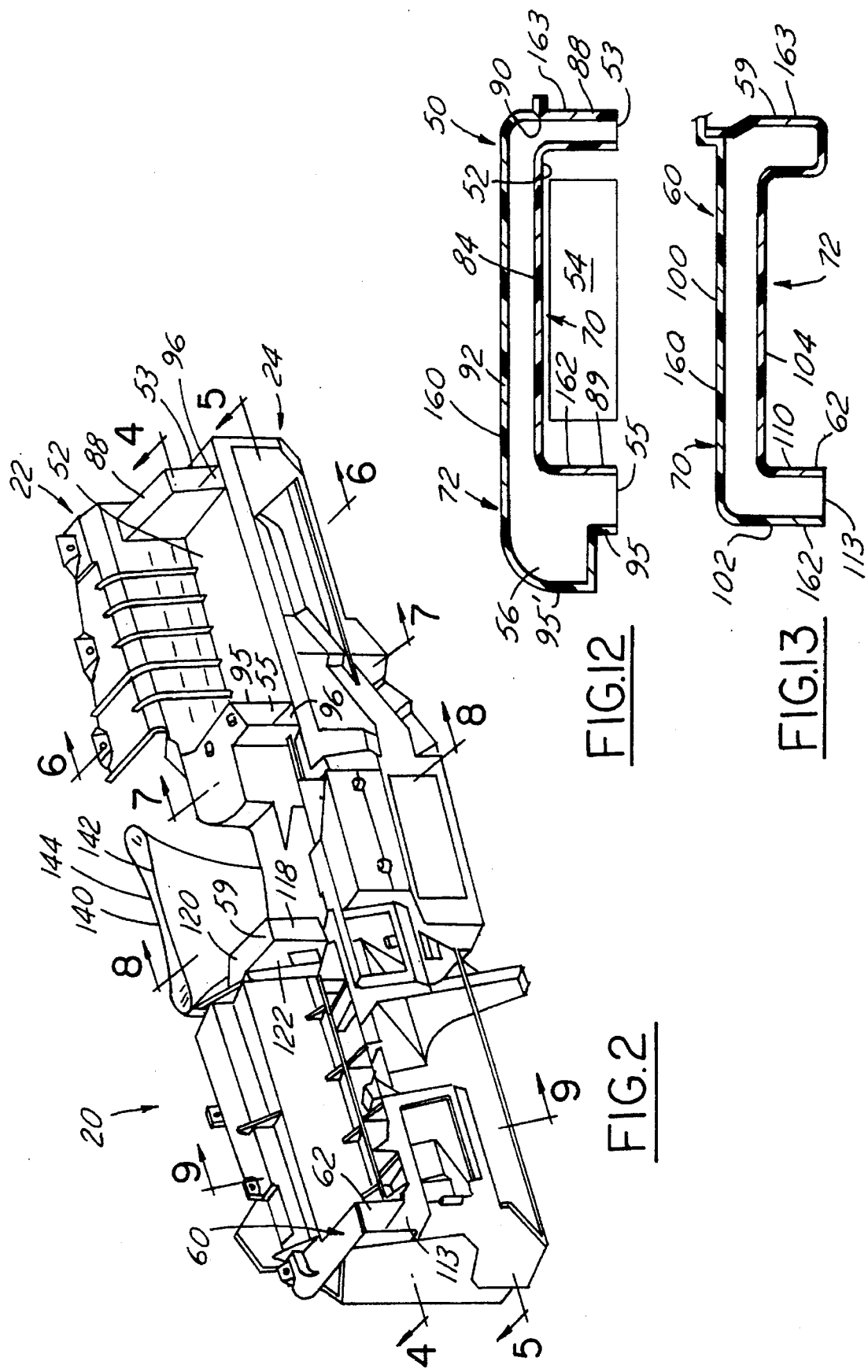
FIG. 2 is a view similar to FIG. 1 but with the instrument cluster, air bag canister, radio and other instruments and components removed so that only the basic instrument panel assembly itself, without any decorative cover, is shown.

Referring now more particularly to the drawings, the instrument panel assembly 20 comprises an upper section 22, sometimes referred to as an instrument panel or instrument panel proper, and a lower section or housing 24 rigidly secured to the upper section. The entire instrument panel assembly, including both the instrument panel proper 22 and housing 24, is made of a resinous plastic material such, for example, as polypropylene or acrylonitrile-butadiene-styrene (ABS) and polycarbonate, and comprises an integral honey-comb structure including a plurality of closed chambers and box-like cells throughout the entire construction to rigidify and reinforce the structure.

The housing 24 comprises a lower tray 26 and an upper cover 28 which are rigidly secured together by any suitable means such as by fasteners.

Mounted in closed compartments 27 and 29 within the housing 24 is heating, ventilating and air conditioning (HEVAC) apparatus 30 including a heater core 32, an evaporator 34 for an air conditioner, and a filter 36. The heater core 32 extends through a vertical wall 35 in housing 24. The HEVAC is capable of heating and/or cooling air within the vehicle or drawn in from outside the vehicle. A blower motor 40 secured to the tray 26 of housing 24 draws air in through an air inlet 42 in the cover 28 and through an opening 43 in a flap 44 formed on the tray 26. The blower motor 40 forces air through the filter 36 and across the evaporator 34 and heater core 32, into closed chambers 45 and 46 for air to be routed to the passenger side and driver side, and then through openings 48 and 49 in the top wall of the cover into the instrument panel 22.

The instrument panel 22 has an integral, elongated air duct 50 (FIGS. 4 and 12) formed of one piece with the instrument panel on the passenger side thereof. Air duct 50 is generally horizontal and C-shaped, forming a rearwardly opening recess 52 for a passenger air bag canister 54. The ends 53 and 55 of the duct 50 are open and directed rearwardly, providing air outlets to discharge air into the vehicle for the purpose of heating, cooling and/or ventilation. Air forced through the opening 49 in the cover of the HEVAC housing 24 enters a chamber 56 in the instrument panel 22 and then flows into the duct 50.

The instrument panel 22 has a second integral, elongated air duct 60 (FIGS. 4 and 13) formed of one piece with the instrument panel 22 and located on the driver's side thereof.

Air duct 60 is generally horizontal and C-shaped, forming a rearwardly opening recess for receiving an instrument cluster 61. One end 62 only of the duct 60 is open and directed rearwardly to discharge air into the vehicle for the purpose of heating, cooling and/or ventilating. The other end 59 of the duct 60 also is directed rearwardly but in this instance is closed. Air generated within the HEVAC housing 24 passes through opening 48 in the housing cover into chamber 63 in the instrument panel 22 and then into duct 60. The ducts 50 and 60 are generally box-shaped, and preferably of rectangular cross-section with spaced apart horizontal top and bottom walls and spaced apart vertical side walls so that each duct has a strong, box beam configuration to reinforce, rigidify and strengthen the instrument panel. This is part of the box-like reinforcing construction previously referred to. The elongated, generally C-shape of the ducts provides further reinforcement.

Figure 10:
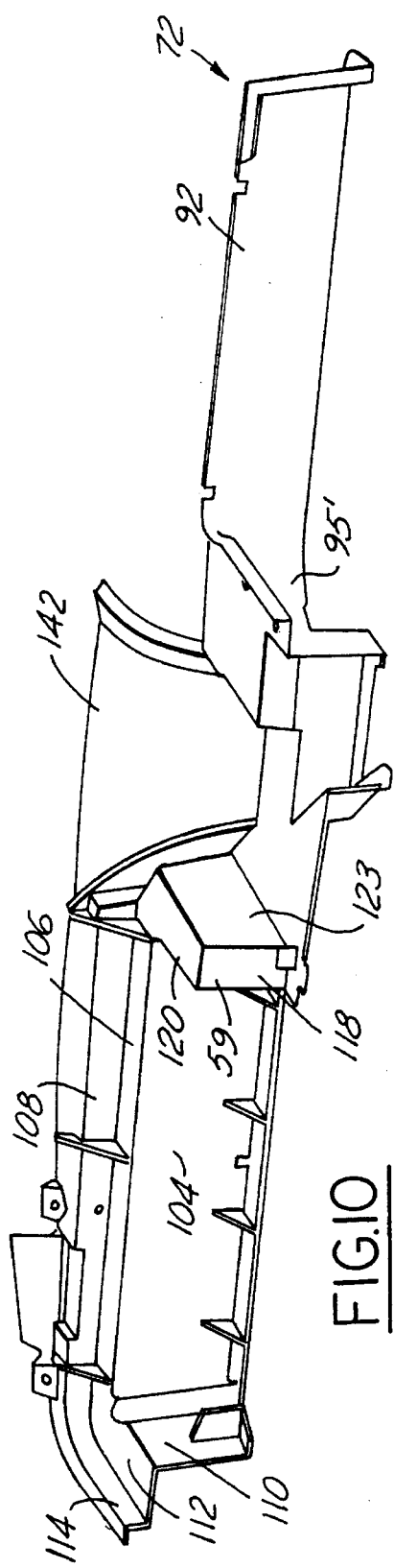
FIG. 10 is a perspective view of the upper duct and component retainer shown in FIG. 3, but as seen from the rear of the car.
Figure 11:
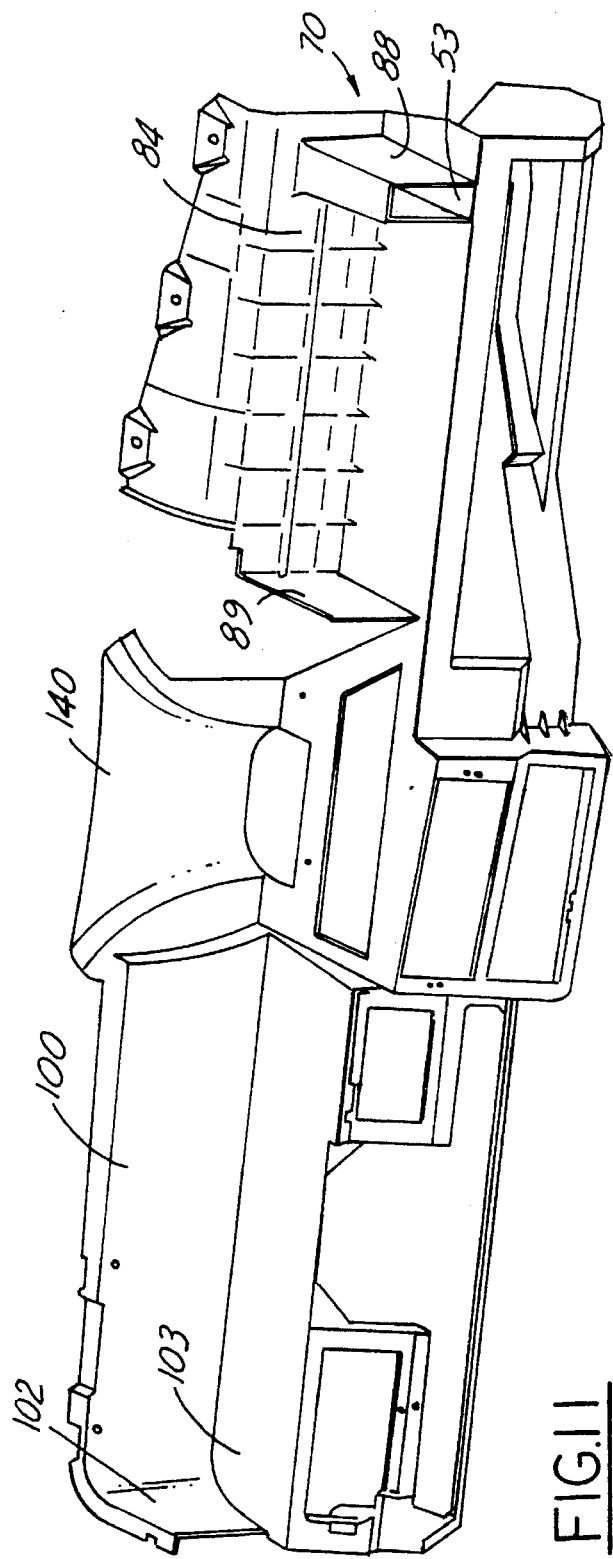
FIG. 11 is a perspective view of the lower duct and component retainer shown in FIG. 3, but as seen from the rear of the car.

The instrument panel proper 22 is preferably made of two separate parts, namely, a laterally elongated lower duct and component retainer 70 (FIGS. 3 and 11) and a laterally elongated upper duct and component retainer 72 (FIGS. 3 and 10) rigidly secured together and to the housing 24 as by suitable fasteners. These duct and component retainers are sometimes referred to herein as "duct retainers". The duct retainer 70 will be seen to have walls forming part of the duct 50, including a vertical, laterally extending, elongated, generally flat rear wall 84, a tunnel 88 extending rearwardly from the right extremity (as viewed by a passenger) of the rear wall 84, and a vertical wall 89 extending rearwardly from the left extremity of the rear wall 84. The tunnel 88 is rectangular, forming a box beam with horizontal top and bottom walls and vertical side walls and extends through an opening 90 in the rear wall 84 and at its rear end forms the air outlet 53 previously described.

The duct retainer 72 has walls forming part of the duct 50, including a vertical, laterally extending, elongated, generally flat front wall 92 disposed generally parallel to and spaced forwardly of the rear wall 84 of duct retainer 70. At its outer extremity, the front wall 92 extends across and beyond the opening 90 in the rear wall 84 of duct retainer 70 and then curves rearwardly into contact with the rear wall 84. Extending rearwardly from the upper edge of the front wall 92 is a top wall 94. The rear edge of the top wall 94 contacts the rear wall 84 and continues around the wall 89 in contact therewith. At its opposite extremity, the front wall 92 extends beyond the rear wall 84 and curves rearwardly at 95', cooperating with the top wall 94 and the wall 89 of duct retainer 70 in defining chamber 56 and a rearward extension of the duct 50 forming a tunnel 95 which terminates in the air outlet 55. The duct retainers 70 and 72 rest on the top of the cover 28 which provides a bottom wall 96 for the duct 50. Thus, the walls 84,89,92,94 and 96, and tunnels 88 and 95 form the duct 50. These walls form the top, bottom and sides of duct 50 in rectangular form providing a box beam or cell-like configuration which is very strong and resistant to bending. All such walls, except wall 96, are of one piece with one or the other of the duct retainers 70 and 72.

The duct retainer 70 also has walls forming part of the duct 60, including a vertical, laterally extending, generally flat front wall 100 and a vertical wall 102 extending rearwardly from the outer extremity of the front wall 100. A horizontal bottom wall 103 extends rearwardly from the lower edge of the front wall 100.

The duct retainer 72 has a vertical, laterally extending elongated, generally flat rear wall 104 disposed generally parallel to and spaced rearwardly of the front wall 100 of duct retainer 70. Along the top edge of rear wall 104 is a forwardly extending horizontal top wall 106 terminating in a vertical flange 108 which contacts the front wall 100 of duct retainer 70. At its outer extremity, the rear wall 104 has a rearwardly extending vertical wall 110 spaced laterally inwardly from wall 102 of duct retainer 70. The vertical wall 110 at its top edge has a laterally outwardly extending horizontal top wall 112 terminating in a vertical flange 114 which contacts the vertical wall 102 of duct retainer 70. Top wall 112 and vertical flange 114 are right angle extensions of top wall 106 and flange 108. The rear edges of the walls 102,103,110 and 112 form a rectangular box-shaped outlet 113 for air to be discharged into the vehicle at the driver's side.

The duct 60 has the rearward extension 59 at its inner side formed by the bottom wall 103 of the duct retainer 70 and the walls 118,120,122 and 123 of the duct retainer 72, but in this instance the extension 59 is closed and does not discharge air.

The walls 100,102,103,104,106,110 112,114,118,120,122 and 123 form the duct 60. These walls are of one piece with one or the other of the duct retainers 70 and 72 and form the top, bottom and sides of the duct 60 in rectangular form providing a box-beam configuration which is very strong and resistant to bending.

The upper and lower duct retainers 70 and 72 have near the midpoint in their length curved and tapered plates 140 and 142 which cooperate in forming a funnel 144 to direct air onto the front windshield. Air is delivered to the funnel from the HEVAC apparatus through an opening 146 in the cover 28 of the housing 24.

Figure 3:
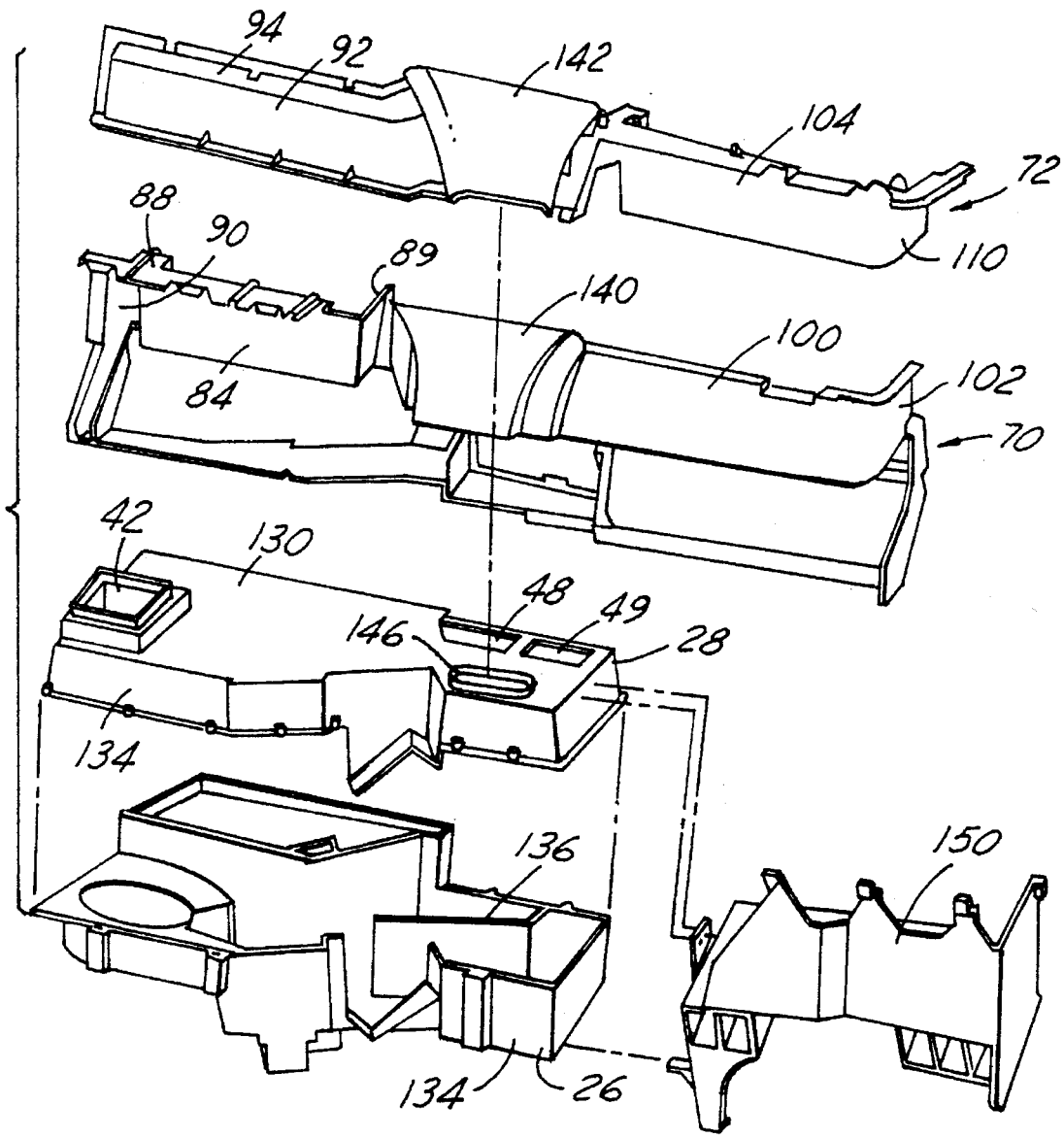
FIG. 3 is an exploded perspective view as seen from the front of the car showing the four basic parts of the instrument panel assembly including the upper duct and component retainer, the lower duct and component retainer, and the bottom tray and cover of the HEVAC housing. This view also shows a metal casting attachable to the HEVAC housing which is adapted to provide a backing plate for a steering column support and a knee blocker.
Figure 4:
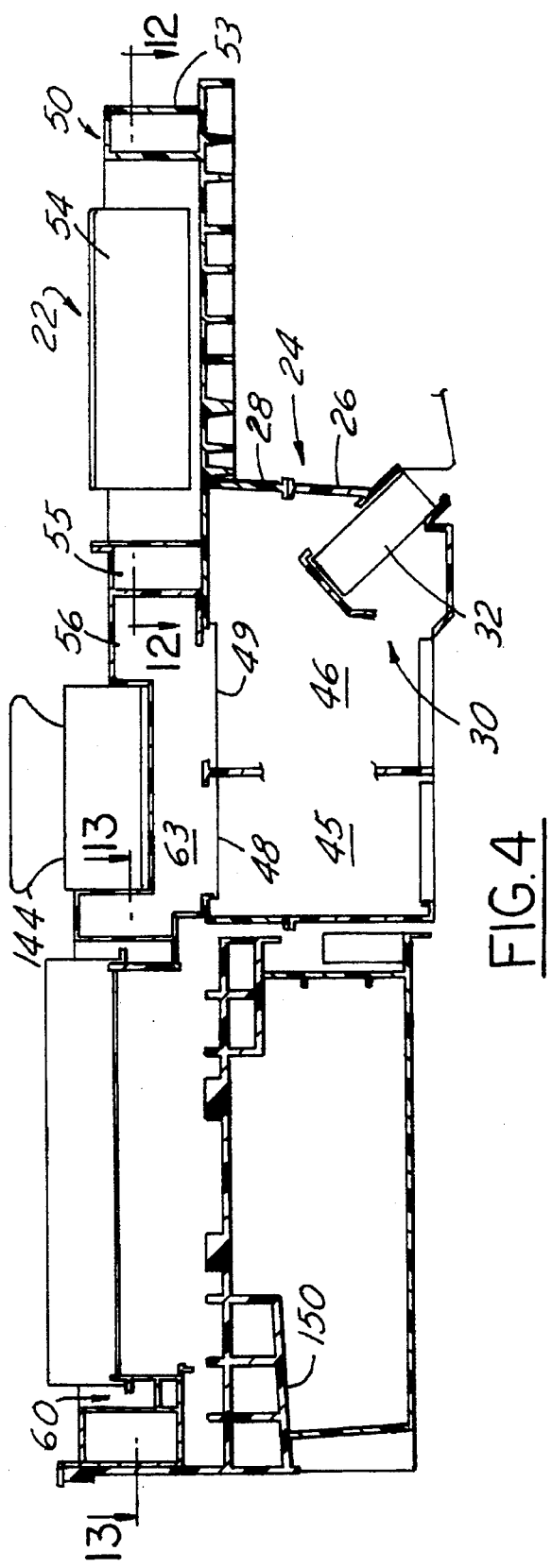
FIGS. 4–9 are sectional views taken on the lines 4—4, 5—5, 6—6, 7—7, 8—8 and 9—9, respectively, in FIG. 2.
Figure 5:
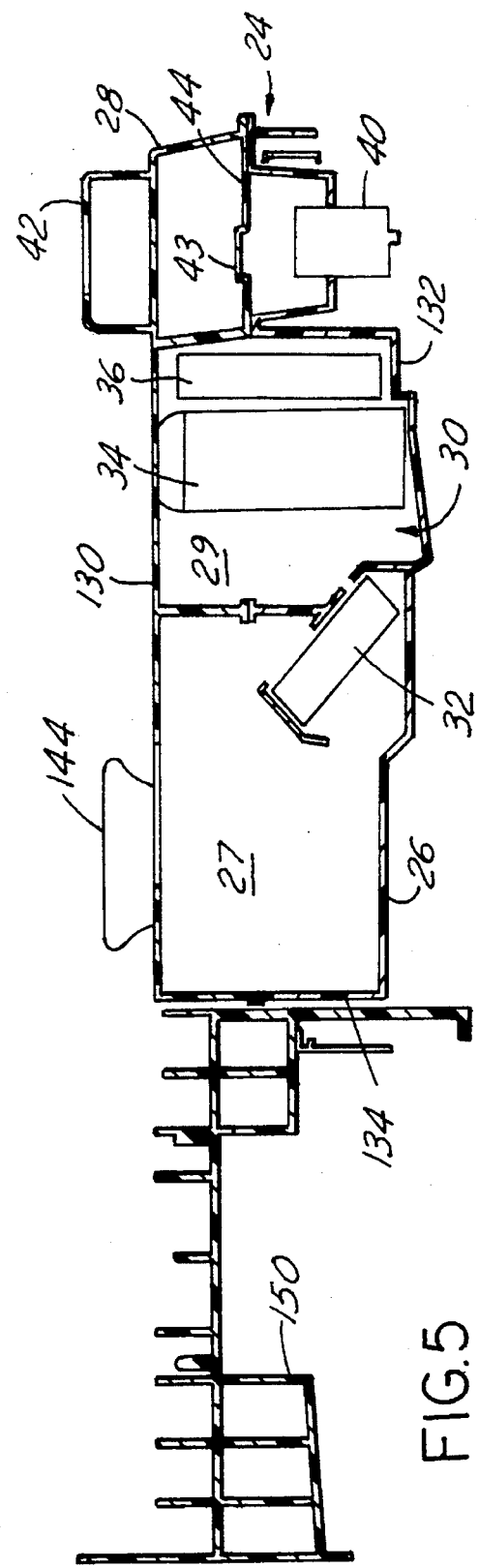
Figure 6:
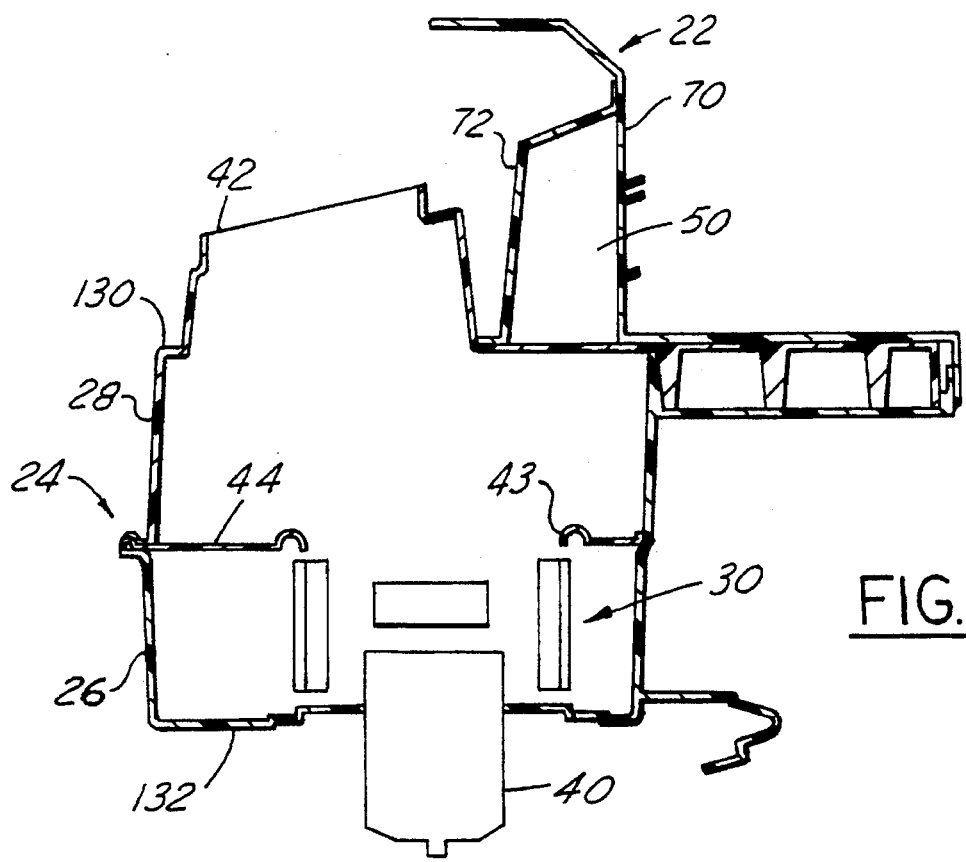
Figure 7:
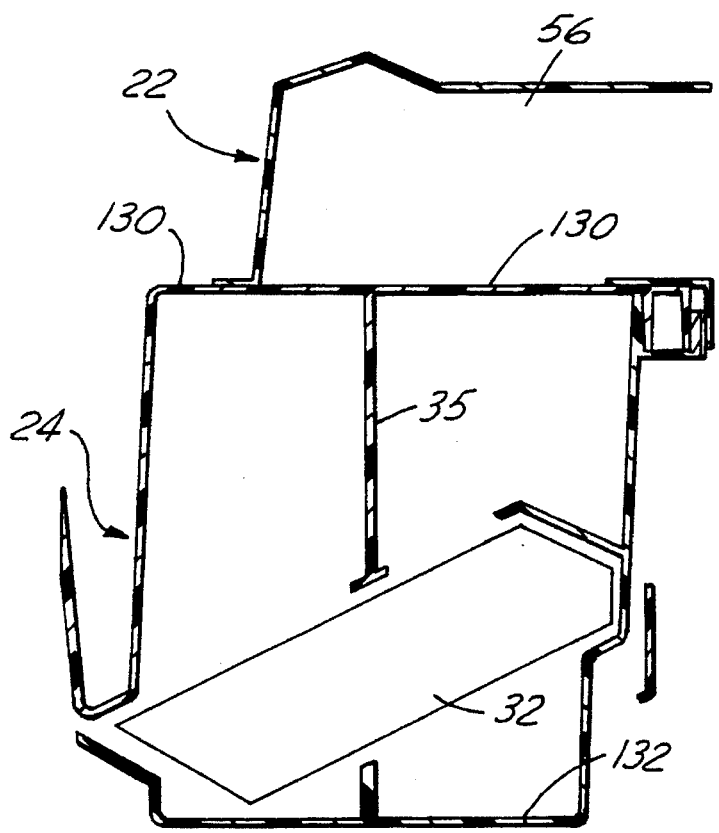
Figure 8:
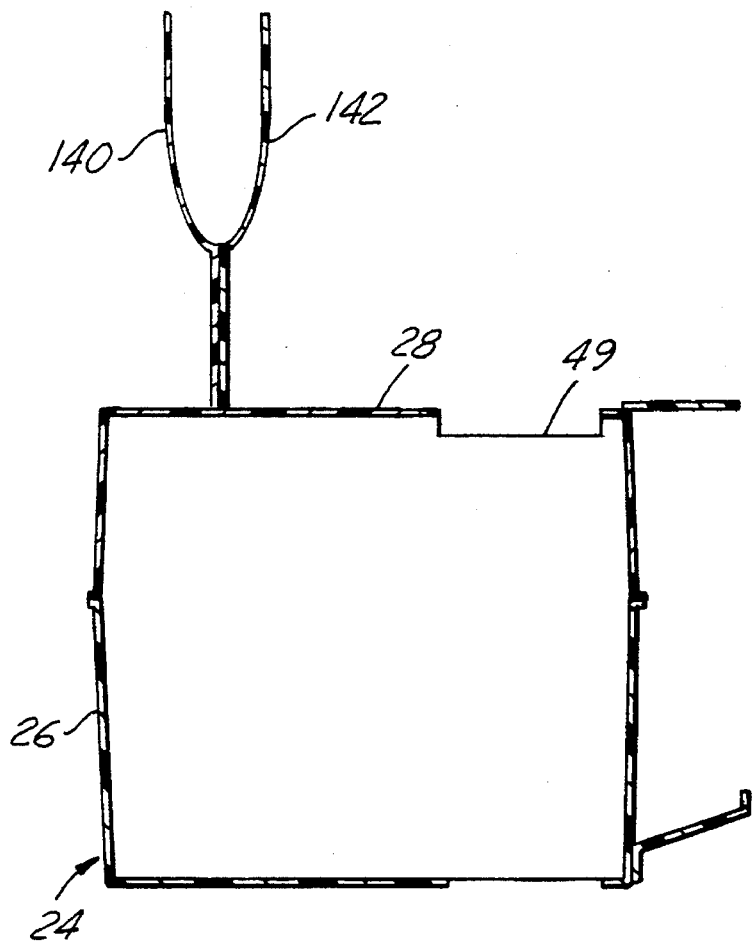
Figure 9:
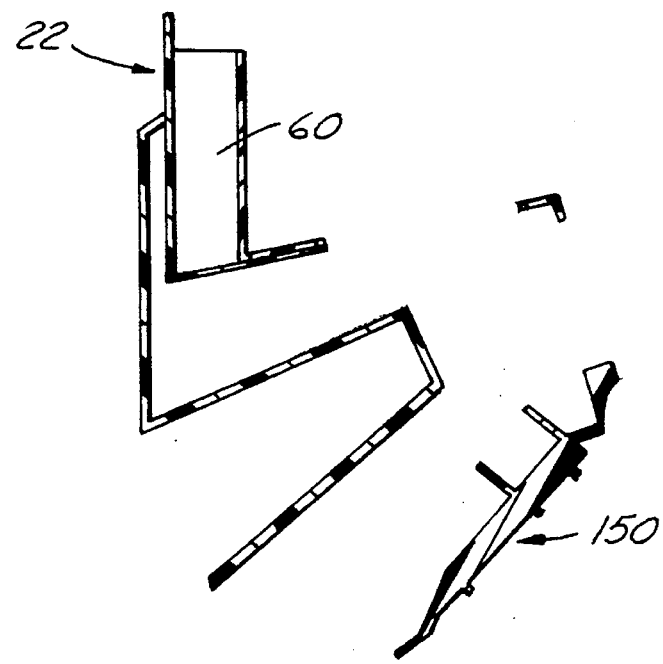

A steering column mounting plate 150, preferably a metal casting, is secured to the cover 28 and tray 26 of the housing and supports a knee blocker 152. Knee blocker 152 is preferably a blow-molded air cell structure having a plurality of individual air cells 154. The air cell structure is directly in front of the driver's knees. Upon impact with the driver's knees in a frontal impact, the air cells will compress, gradually absorbing energy and minimizing injury. The mounting plate 150 also supports the steering column. The mounting plate 150 preferably has a honey-comb, or cellular structure as shown in FIGS. 3–5 to add rigidity and strength.

The ducts 50 and 60 are each generally C-shaped as shown in FIGS. 12 and 13, each having a straight mid-section 160 and end portions 162,163 perpendicular to the mid-section. This C-shape adds to the structural rigidity of the instrument panel assembly. The housing for the HEVAC apparatus is made of generally horizontal top and bottom walls 130 and 132 and generally vertical side walls 134 and internal partitions 136 which provide structural rigidity. FIGS. 3–9 show clearly the closed chambers and the cellular, box-like or honey-comb structure of the housing 24. Because of the reinforcement resulting from this construction, no steel substructure is needed. The HEVAC apparatus 30 can be preloaded into the tray 26 of the housing 24, the cover 28 secured to the tray, and the duct retainers 70 and 72 secured together and to the housing quickly and easily, after which the entire instrument panel assembly including the HEVAC apparatus may be installed in the vehicle as a unit.

What is claimed is:

1. An instrument panel assembly for an automotive vehicle comprising an upper section and a lower section rigidly secured together, said lower section comprising a tray and a cover cooperating with said tray to form a housing for heating, ventilating and air conditioning (HEVAC) apparatus capable of heating and/or cooling air within the vehicle or drawn in from outside the vehicle, said upper section comprising an upper duct retainer and a lower duct retainer, a duct leading from a port in said cover through said upper section for channeling air received from the HEVAC apparatus in the lower section and discharging the same into the vehicle, said duct having walls made of one piece with said upper section, some of the walls of said duct being formed integrally with said upper duct retainer and others being formed integrally with said lower duct retainer, said cover of said lower section having a top panel cooperating with the walls of said duct in defining a passage of generally rectangular cross-section, said walls of said duct and said top panel rigidifying and providing structural support for said instrument panel assembly, said housing defining a compartment for enclosing the HEVAC apparatus and having air passages placing said compartment in communication with said port for delivering air from the HEVAC apparatus to said duct, said compartment and air passages each having partitions made of one piece with said housing, said partitions rigidifying and providing structural strength for the housing, said upper and lower sections of said instrument panel assembly having an integral honeycomb structure providing a plurality of box-like cells throughout to rigidify the assembly, said instrument panel assembly comprising said upper and lower sections and including said tray, said cover, said housing, said duct retainers, said duct, said compartments, said passages and said partitions being made entirely of a molded resinous plastic material.

2. An instrument panel assembly as defined in claim 1, wherein said top panel of said cover has an opening and said upper and lower duct retainers have plate portions defining a funnel for receiving air from said opening and directing it upwardly from said upper duct retainer.

3. An instrument panel assembly as defined in claim 2, and further including a knee blocker for absorbing the force of the knees of a driver thereagainst in a frontal impact, and a steering column support plate having a honeycomb structure mounting said knee blocker on said instrument panel assembly.

\* \* \* \* \*